United States Patent Office 3,494,451
Patented Feb. 10, 1970

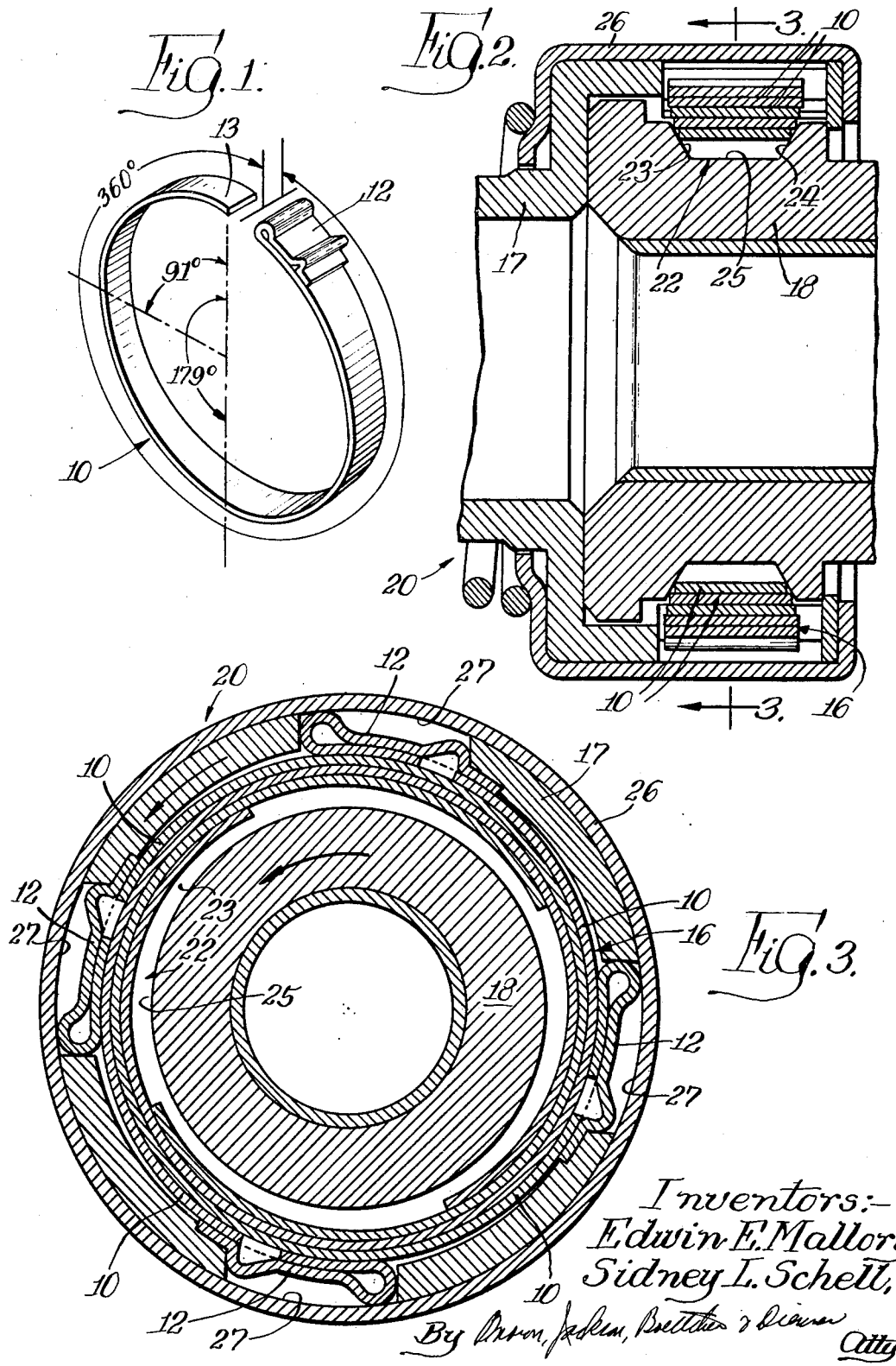

3,494,451
BAND CLUTCH CONSTRUCTIONS
Edwin E. Mallory, Niles, Mich., and Sidney L. Schell, South Bend, Ind.; said Mallory assignor to National-Standard Company, Niles, Mich., a corporation of Delaware, and said Schell assignor to John M. Dodwell, Buchanan, Mich.
Continuation of application Ser. No. 733,212, May 9, 1968, which is a continuation of application Ser. No. 565,217, July 14, 1966. This application Oct. 16, 1968, Ser. No. 770,139
Int. Cl. F16d 13/12
U.S. Cl. 192—41                    2 Claims

ABSTRACT OF THE DISCLOSURE

An overrunning band clutch construction embodying a plurality of interfitting and overlapping bands wider at one end than at the other end, anchored at their wide ends in uniformly angularly spaced apart relation in a first clutch member, in which the narrower ends of each of the bands overlaps the narrower end of the next radially inwardly disposed band, and in which the side edges of the narrower ends of the bands have contacting engagement with the side edges of a V-groove of a second clutch member in an amount more than once and less than twice the angular distance between a pair of successive anchored ends of the bands. A clutch band as aforenoted which is less than 360° in circumferential extent.

---

This application is a continuation of our earlier application Ser. No. 733,212, filed May 9, 1968, now abandoned, which in turn was a continuation of prior co-pending application Ser. No. 565,217 filed July 14, 1966, now abandoned.

The present invention relates to overrunning clutch constructions of the class embodying clutch drive and clutch driven members, disposed coaxially with respect to each other with one of the ends of each of the clutch members in overlapping or telescoping relation, together with torque transmitting means defined by a plurality of interfitting and overlapping tapered spiral bands disposed in a peripheral V-groove in one of the clutch members, and in which the wider ends of each of the bands is anchored to the other clutch member with the narrower ends of the bands being free and extending into the V-groove of the one clutch member.

A clutch construction of the character aforenoted is well known and is typically shown and described in United States Patent No. 2,518,453 issued Aug. 15, 1954 to John M. Dodwell.

In known clutches of the aforementioned class, the spiral bands generally exceed 360° in circumferential extent to provide for satisfactory engagement of the clutch bands with the side walls of the V-groove in one of the clutch members. While such constructions operate satisfactorily, it is difficult to manufacture the bands and interfit them in overlapping relation in that they exceed the aforementioned 360° in circumferential extent.

The present invention provides for the use in a clutch construction of tapered spiral clutch bands approximating but being slightly less than 360° in circumferential extent so that the bands may be more easily fabricated than the aforementioned known clutch bands.

According to the present invention, tapered spiral clutch bands approximating but being less than 360° in circumferential extent may be satisfactorily employed in a band clutch, as for example, by providing anchors at the wider ends of the bands which may be anchored in uniformly angularly spaced apart relation in a clutch drive member, and with the narrower end of each of the bands overlapping the narrower end of the next radially inwardly disposed bands. Importantly for effecting engagement of clutch bands the present invention comprehends an arrangement in which the side edges of narrower ends of the bands have contacting engagement with the sides of the V-groove of a driven clutch member in an amount more than once and less than twice of the angular distance between a pair of successive anchored ends of the bands. The narrower ends of each of the bands extends beyond the narrower end of the adjacent radial inward band so that the narrower ends of the several bands do not tend to straighten out. The arrangement noted serves to prevent breaking of the tips at the narrower ends of the bands and, additionally, the several bands function like a solid ring like member when the several side edges of the several bands are in frictional driving engagement with the sides of the V-groove of the driven clutch member.

The above and other objects and advantages of the invention will appear from the following detailed description of a preferred embodiment of the invention.

The preferred embodiment of the invention is disclosed in the accompanying drawings in which:

FIGURE 1 is a perspective view of a typical clutch band constructed in accordance with the principles of the present invention;

FIGURE 2 is a longitudinal cross sectional view through a clutch construction in accordance with the present invention; and FIGURE 3 is a detail vertical sectional view taken substantially on the line 3—3 of FIGURE 1 looking in the direction indicated by the arrows.

Referring now to FIGURE 2, there is shown a clutch band 10 according to the present invention. The band 10 it will be noted approximates but is less than 360° in circumferential extent. The band 10 is tapered in width from one end to the other end thereof with their being an anchor 12 formed at the wider end of the band as by folding of the material at the wide end back upon itself to define the anchor. As indicated, the band tapers in width from its wider end 12 to its narrower end 13. The clutch band 10 can be formed from any suitable spring steel stock and when completed is of spiral configuration as seen in FIGURE 1.

In FIGURES 2 and 3 there is shown a plurality of the clutch bands 10, four in the particular embodiment illustrated, defining torque transmitting means 16 between a drive clutch member 17 and a driven clutch member 18 of the clutch illustrated generally at 20. The driven clutch member 18 is formed with a V-groove 22 defined by opposed side walls 23 and 24 tapering inwardly toward each other from the periphery of member 18 to the bottom wall 25 for receiving the torque transmitting means 16. The drive clutch member 17 is disposed coaxially with respect to the driven clutch member 18 and an outer annular housing 26 may be provided to encase and retain assembled the drive and driven clutch members.

The drive member 17, as best seen in FIGURE 3, is provided with a plurality of uniformly angularly spaced apart pockets 27 each receiving an anchor 12 of one each of the spiral clutch bands 10. The several clutch bands are arranged in interfitting and overlapping relation and extend from the anchored ends thereof into the V-groove 22 of the driven clutch part 18 and with the narrower free ends of each of the bands terminating at a point approximating but less than 360° in circumferential extent.

In the clutch above described upon rotation of the drive member 17, in a counterclockwise direction, as indicated by the arrow, the several bands are radially contracted to engage the side edges thereof with the side walls 23 and 24 of the V-groove 22, driving the driven member 18 in a counterclockwise direction as indicated by the arrow applied to the latter. However, when the driven clutch member 18 overruns the drive member 17 the frictional driving engagement of the side edges of the several bands 10 with the walls of the V-groove releases to thus drivingly disengage the driving and driven clutch members. Thus, in the arrangement of the parts as shown, when the driven member 18 is rotating in the same direction but at a faster speed than the drive member 17 and driven member 18 overruns the drive member 17.

Importantly, in the arrangement of torque transmitting means 16 composed of a plurality of the spiral clutch bands 10 as above described, it is to be noted that the narrow tapered end portion of each band overlaps or extends beyond the narrow end of the next radially inwardly disposed band, and the side edges of each narrow end engages the side walls 23 and 24 an amount more than once of the angular distance between a pair of successive pockets 27 for receiving the anchors for the bands. Preferably, for economy purposes for maximum torque for a given clutch size it is critical that only the side edges of the bands starting from the free ends of the bands engage the side walls 23 and 24 in an amount more than once and less than twice the angular distance between a pair of successive pockets 27. Thus, in a clutch construction embodying the four bands 10 as shown in the drawings, the anchors 12 of the four bands are disposed 90° apart with respect to each other and the side edges of the narrower ends of the bands may typically be in engagement with the sides 23 and 24 of the groove 22 for at least 91°. As another example, in a six band clutch in which the anchor ends are spaced apart 60° with respect to each other, the engaging relation of the side edges of the narrow end portions of the bands with the sides of the V-groove, would be in a minimum amount of 61°.

In the above construction narrow ends of the several bands are prevented from straightening out thus controlling the flexing of the several bands and relieving the bands of a stress riser tending to fracture the free ends of the bands.

While there has been shown and described preferred embodiments of the invention, it will be understood that various modifications and rearrangements may be made therein without departing from the spirit and scope of the invention.

The invention claimed is:

1. In a clutch having clutch drive and clutch driven members disposed coaxially with respect to each other and in which said one of said clutch members has a circumferentially extending V-groove therein, the combination of one-way torque transmitting means comprising a plurality of interfitting and overlapping spiral bands each being wider at one end than at the other end portions thereof, said bands being anchored at the wider ends thereof in uniformly angularly spaced apart relation in one of said clutch members and said bands having their other end portions extending into said V-groove of said other clutch member, and said other end portions of each of said bands overlapping said other end portion of the adjacent band with the side edges of said other end portions of each of said bands starting from the free ends of the bands engaging the sides of said V-groove in an amount more than once and less than twice of the angular distance between a pair of successive anchored ends of said bands.

2. The torque transmitting means of claim 1 characterized by said clutch bands approximating but being less than 360° in circumferential extent.

References Cited

UNITED STATES PATENTS 2,917,144  12/1959  Dodwell _____ 192—81 XR
3,270,845   9/1966  Dodwell _____ 192—81

MARK NEWMAN, Primary Examiner

ALLAN D. HERRMAN, Assistant Examiner

U.S. Cl. X.R.

192—81